US012800018B2

(12) United States Patent
Fujii et al.

(10) Patent No.: US 12,800,018 B2
(45) Date of Patent: Nov. 17, 2026

(54) AIR BREATHER STRUCTURE

(71) Applicants: JATCO Ltd, Fuji (JP); NISSAN MOTOR CO., LTD., Yokohama (JP)

(72) Inventors: Toshiyuki Fujii, Fuji (JP); Atsushi Ikeda, Isehara (JP); Yasuaki Yumoto, Machida (JP); Tomohiro Oomura, Fuji (JP); Akira Tsuchida, Sagamihara (JP)

(73) Assignees: JATCO Ltd, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 19/099,722

(22) PCT Filed: Jun. 28, 2023

(86) PCT No.: PCT/JP2023/023943

§ 371 (c)(1),
(2) Date: Jan. 29, 2025

(87) PCT Pub. No.: WO2024/034283

PCT Pub. Date: Feb. 15, 2024

(65) Prior Publication Data

US 2026/0036195 A1 Feb. 5, 2026

(30) Foreign Application Priority Data

Aug. 8, 2022 (JP) ................................ 2022-126640

(51) Int. Cl.
*F16H 57/027* (2012.01)
*F16H 57/04* (2010.01)

(52) U.S. Cl.
CPC ....... *F16H 57/027* (2013.01); *F16H 57/0423* (2013.01)

(58) Field of Classification Search
CPC ........................... F16H 57/027; F16H 57/0423
See application file for complete search history.

(56) References Cited

U.S. PATENT DOCUMENTS 4,351,203 A * 9/1982 Fukunaga ........... F16H 57/0483 74/606 R
4,468,979 A * 9/1984 Inagaki ............... F16H 57/0489 74/606 R (Continued)

FOREIGN PATENT DOCUMENTS

JP H10-205609 A 8/1998
JP 2007-321928 A 12/2007

*Primary Examiner* — Jake Cook
(74) *Attorney, Agent, or Firm* — Foley & Lardner LLP

(57) ABSTRACT

An air breather structure is provided in a case including a first case member and a second case member that form an accommodating chamber in a state of being mated to each other. The air breather structure includes an air breather chamber that is formed as a cavity surrounded by mating a first inner wall portion as an inner wall portion of the first case member and a second inner wall portion as an inner wall portion of the second case member, and that is provided with a first communication portion communicating with the accommodating chamber and a second communication portion communicating with the atmosphere; and a defense chamber that is adjacent to the air breather chamber between the accommodating chamber and the air breather chamber, and that is formed as a cavity surrounded by mating the first inner wall portion and the second inner wall portion.

6 Claims, 8 Drawing Sheets

(56) References Cited

U.S. PATENT DOCUMENTS

| | | | | |
|---|---|---|---|---|
| 4,595,118 | A * | 6/1986 | Azuma | F16H 57/027<br>74/606 R |
| 4,911,035 | A * | 3/1990 | Taguchi | F16H 57/027<br>74/606 R |
| 6,719,096 | B2 * | 4/2004 | Mogi | F16H 57/027<br>74/606 R |
| 8,042,431 | B2 * | 10/2011 | Nakata | F16H 57/027<br>74/606 R |
| 8,104,374 | B2 * | 1/2012 | Matsubara | F16H 57/027<br>474/146 |
| 10,072,749 | B2 * | 9/2018 | Reth | B60K 17/3465 |
| 2008/0041179 | A1 * | 2/2008 | Yasui | F16H 57/0421<br>74/606 R |

* cited by examiner

AIR BREATHER STRUCTURE

TECHNICAL FIELD

The present invention relates to an air breather structure.

BACKGROUND ART

Patent Document 1 discloses an air breather chamber formed by abutment of inner wall portions of both a converter housing and a transmission case. The air breather chamber communicates with the inside of a casing via an upper communication portion and a lower communication portion, and communicates with the atmosphere via an atmosphere communication hole.

PRIOR ART DOCUMENT

Patent Document

Patent Document 1: JPH10-205609A

SUMMARY OF INVENTION

Since the inner wall portion of the case does not constitute a partition wall between an accommodating chamber of the case and the atmosphere, there is a case in which a space between mating surfaces of inner wall portions of two case members is not completely sealed by a seal member, for example, the space is not particularly sealed by the seal member. Therefore, a gap may be formed between the mating surfaces due to a dimension error, an assembly error, deformation, or the like. As a result, there is a possibility that in the air breather chamber formed by mating the inner wall portions of the two case members, oil enters from the accommodating chamber of the case through such a gap and is discharged to the atmosphere via a communication portion with the atmosphere provided in the air breather chamber.

The present invention has been made in view of such a problem, and an object of the present invention is to restrain the discharge of oil from an air breather chamber to the atmosphere.

An air breather structure according to an aspect of the present invention is provided in a case including a first case member and a second case member that form an accommodating chamber in a state of being mated to each other. The air breather structure includes an air breather chamber that is formed as a cavity surrounded by mating a first inner wall portion as an inner wall portion of the first case member and a second inner wall portion as an inner wall portion of the second case member, and that is provided with a first communication portion communicating with the accommodating chamber and a second communication portion communicating with the atmosphere; and a defense chamber that is adjacent to the air breather chamber between the accommodating chamber and the air breather chamber, and that is formed as a cavity surrounded by mating the first inner wall portion and the second inner wall portion.

According to this aspect, since the defense chamber adjacent to the air breather chamber between the accommodating chamber and the air breather chamber is provided, the defense chamber serves to restrain the entry of the oil into the air breather chamber, and the entry of the oil into the air breather chamber becomes difficult. Further, even when the oil enters into the air breather chamber, the entered oil can be discharged to the accommodating chamber via the first communication portion. Therefore, it is possible to restrain the discharge of the oil from the air breather chamber to the atmosphere.

DESCRIPTION OF EMBODIMENTS

Hereinafter, an embodiment of the present invention will be described with reference to the accompanying drawings.

Figure 1:
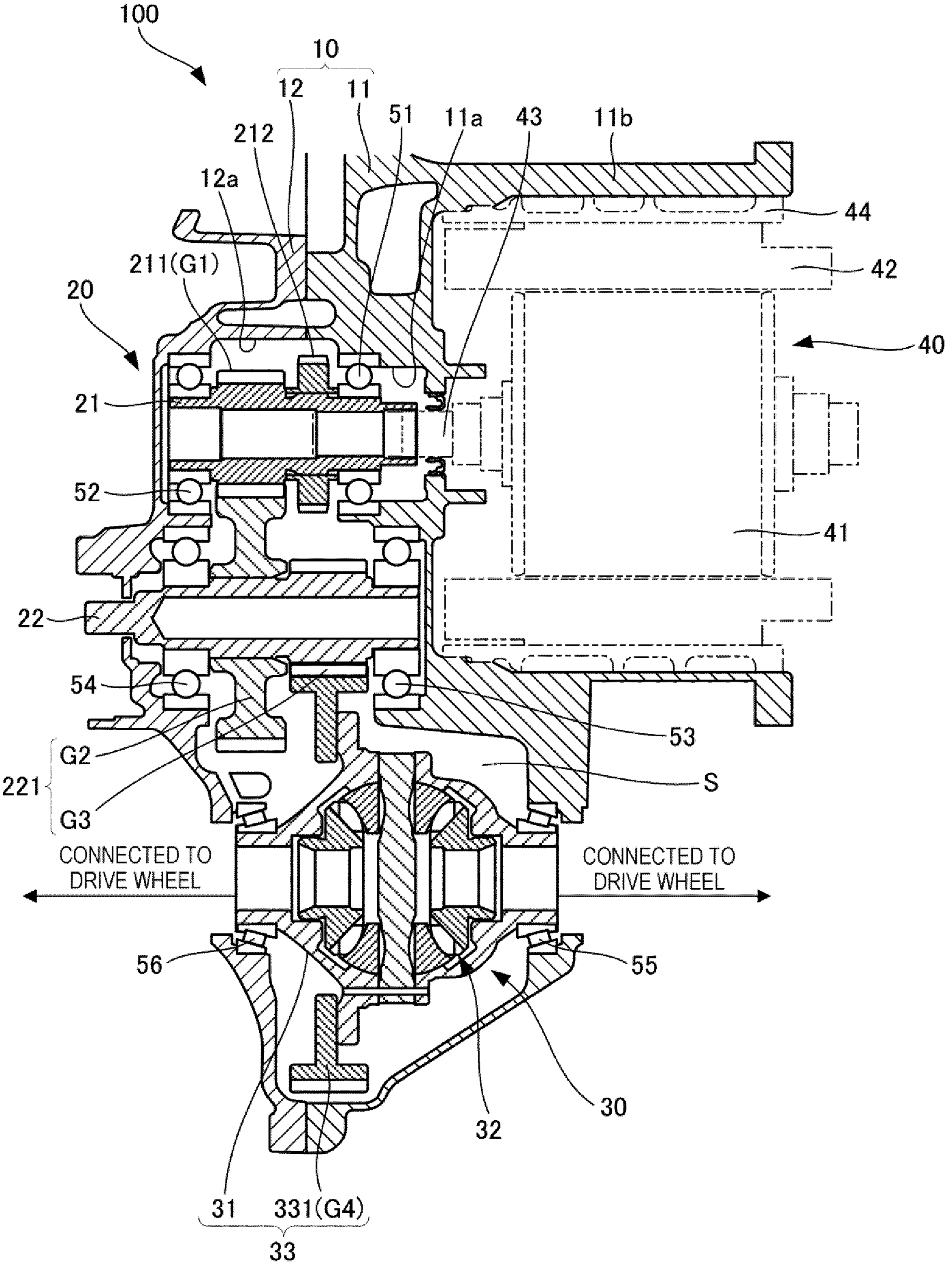
FIG. 1 is a schematic configuration diagram of a power transmission device.

FIG. 1 is a schematic configuration diagram of a power transmission device 100 according to the present embodiment. In FIG. 1, a rotating electrical machine 40 is shown by a two-dot chain line. As shown in FIG. 1, the power transmission device 100 includes a case 10, a deceleration mechanism 20, and a differential gear 30. The power transmission device 100 is mounted on a vehicle. The vehicle is an electric vehicle using the rotating electrical machine 40 as a power source. The power transmission device 100 transmits power from the rotating electrical machine 40 to drive wheels. The power transmission device 100 can also transmit the power from the drive wheels to the rotating electrical machine 40.

The case 10 includes a case body 11 as a first case member and a housing 12 as a second case member. The case body 11 is provided on one side (right side in FIG. 1) in an axial direction, and the housing 12 is provided on the other side (left side in FIG. 1) in the axial direction. The axial direction is an extending direction of a shaft (power transmission shaft) of the power transmission device 100, and each of extending directions of a first shaft 21, a second shaft 22, and a third shaft 33 to be described later corresponds to the axial direction.

The case body 11 has an accommodating portion 11*a*, and the housing 12 has an accommodating portion 12*a*. The accommodating portion 11*a* opens toward the left side in FIG. 1, and the accommodating portion 12*a* opens toward the right side in FIG. 1. The housing 12 is provided in the case body 11, and closes an opening of the accommodating portion 11*a* with an opening of the accommodating portion 12*a*. A space formed by the accommodating portion 11*a* and the accommodating portion 12*a* constitutes an accommodating chamber S of the case 10. The accommodating chamber S is formed by mating the case body 11 and the housing 12 with each other.

The case body 11 further includes a cylindrical portion 11*b*. The cylindrical portion 11*b* is provided on the right side in FIG. 1 with respect to the accommodating portion 11*a*. The rotating electrical machine 40 is disposed in the cylindrical portion 11*b*. Therefore, the power transmission device 100 can be also understood as a configuration further including the rotating electrical machine 40. The rotating electrical machine 40 is fixed to an inner periphery of the cylindrical portion 11*b*.

The rotating electrical machine 40 includes a rotor 41, a stator 42, a rotary shaft 43, and a motor case 44. The rotor 41 is accommodated in the stator 42, and the stator 42 is fixed to the inner periphery of the cylindrical portion 11*b* via the motor case 44. The rotary shaft 43 protrudes into the accommodating portion 11*a* through a through hole penetrating a partition wall between the inside of the accommodating portion 11*a* and the inside of the cylindrical portion 11*b*, and a seal member is provided between the through hole and the rotary shaft 43. Therefore, the inside of the cylindrical portion 11*b* as a space in which the rotating electrical machine 40 is disposed is separated from the accommodating chamber S that is a space in which the deceleration mechanism 20 and the differential gear 30 are disposed, and does not constitute the accommodating chamber S.

The deceleration mechanism 20 is a gear mechanism, and includes the first shaft 21 and the second shaft 22. The first shaft 21 is connected to the rotating electrical machine 40. The first shaft 21 is connected to the rotating electrical machine 40 in a power transmittable manner. This connection may be connection performed via other configurations (for example, a clutch or another gear mechanism). In the present embodiment, the first shaft 21 is directly connected to the rotating electrical machine 40 by being directly connected to the rotary shaft 43. The phrase "the first shaft 21 is directly connected to the rotating electrical machine 40" means that the first shaft 21 is disposed on an axis of the rotating electrical machine 40 and is directly connected to the rotating electrical machine 40 without using a clutch or another gear mechanism.

The first shaft 21 includes a first gear portion 211. The first gear portion 211 is constituted by a first gear G1. The first gear portion 211 is integrally formed with the first shaft 21, and outputs the power from the rotating electrical machine 40. The first shaft 21 is shaft-supported on the case 10 by being supported by the case body 11 via a bearing 51 on one side in the axial direction and by being supported by the housing 12 via a bearing 52 on the other side in the axial direction. A park gear 212 is also provided on a portion of the first shaft 21 between the first gear portion 211 and the bearing 51. The first shaft 21 constitutes a first shaft of the power transmission device 100.

The second shaft 22 includes a second gear portion 221. The second gear portion 221 is constituted by a second gear G2 and a third gear G3. The second gear G2 is integrally formed with the second shaft 22 by press-fitting, and the third gear G3 is integrally formed with the second shaft 22. The third gear G3 is disposed on the right side of FIG. 1 with respect to the second gear G2, that is, on the side closer to the rotating electrical machine 40. The second gear G2 meshes with the first gear G1, and power is input from the first gear G1 to the second gear G2.

The power input to the second gear G2 is output from the third gear G3. Therefore, the second gear portion 221 receives the power from the first gear G1 and outputs the received power. The second gear G2 has a larger number of teeth than those of the first gear G1, and constitutes a first deceleration gear stage together with the first gear G1. The second shaft 22 is shaft-supported on the case 10 by being supported by the case body 11 via a bearing 53 on one side in the axial direction and by being supported by the housing 12 via a bearing 54 on the other side in the axial direction. The second shaft 22 constitutes a second shaft of the power transmission device 100.

The differential gear 30 is a differential gear mechanism, and includes a differential case 31, a fourth gear G4 as a final gear, and a differential portion 32. The differential case 31 is shaft-supported on the case 10 by being supported by a bearing 55 provided in the case body 11 and a bearing 56 provided in the housing 12. The fourth gear G4 is coaxially fixed to an outer wall portion of the differential case 31. The fourth gear G4 meshes with the third gear G3, and power is input to the fourth gear G4 from the third gear G3. The differential case 31 constitutes the third shaft 33 of the power transmission device 100 together with the fourth gear G4. The fourth gear G4 constitutes a third gear portion 331 of the third shaft 33.

The differential case 31 accommodates the differential portion 32, and the differential portion 32 distributes and outputs power input to the differential case 31 via the fourth gear G4 to the drive wheels in a left-right direction of the vehicle. Therefore, the fourth gear G4 as the third gear portion 331 is connected to the drive wheels via the differential case 31 and the differential portion 32, and transmits the input power to the drive wheels.

The fourth gear G4 has a larger number of teeth than those of the third gear G3, and constitutes a second deceleration gear stage together with the third gear G3. Therefore, in the power transmission device 100, deceleration in two stages is performed by the first gear G1 and the second gear G2, and the third gear G3 and the fourth gear G4.

An oil reservoir is formed in a lower portion of the case 10, and the fourth gear G4 is immersed in the oil reservoir. The fourth gear G4 scrapes up oil in the oil reservoir so as to scrap up and circulate the oil in the case 10. The fourth gear G4 is provided at a height at which at least a part thereof is immersed in the oil reservoir regardless of whether the device is being driven or stopped.

The power transmission device 100 is a power transmission device having a three-shaft configuration in which a total of three shafts, that is, the first shaft 21, the second shaft 22, and the third shaft 33, are disposed in the accommodating chamber S as the power transmission shafts. The shafts of the power transmission device 100 are implemented by a plurality of shafts that are sequentially connected from a radial direction by meshing of the gear portions.

Figure 2:
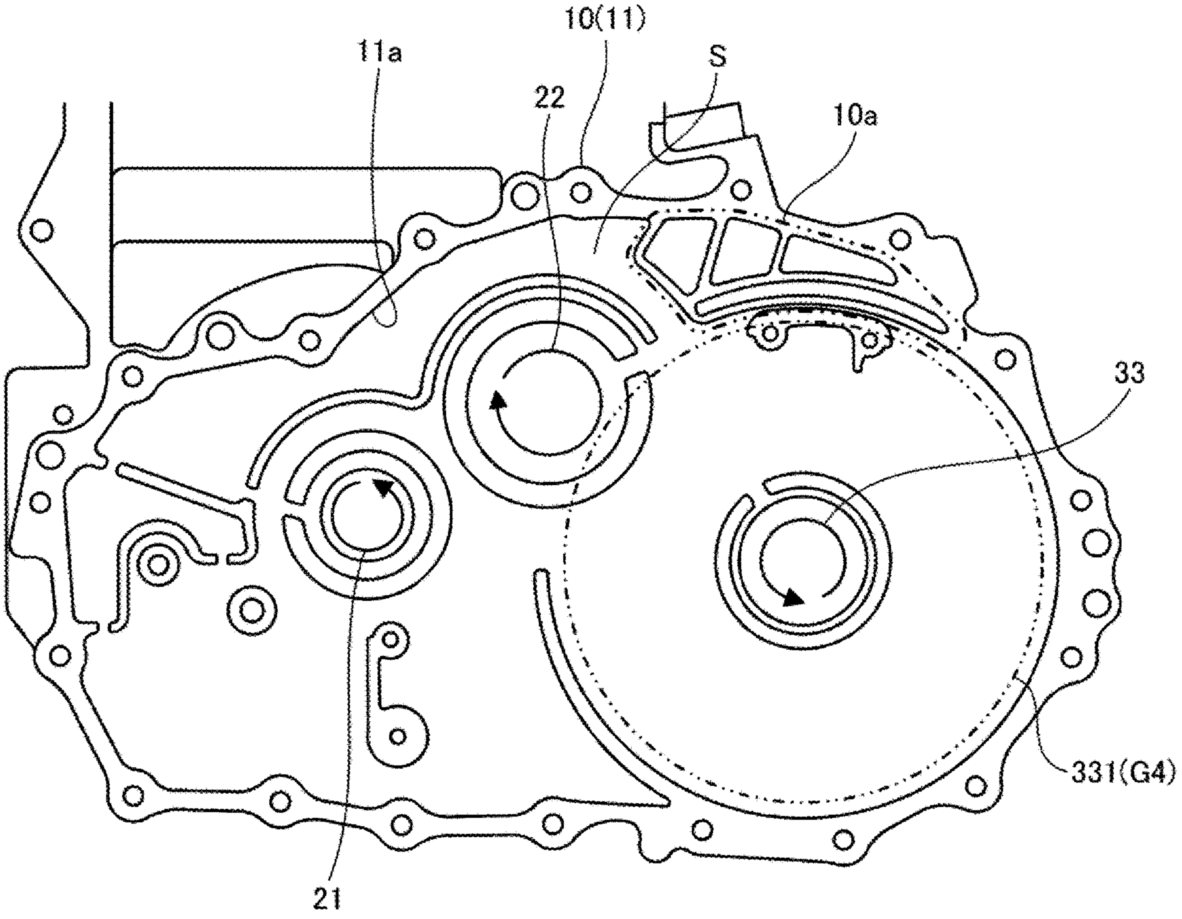
FIG. 2 is a view of a case body when viewed from a housing side in an axial direction.
Figure 3:
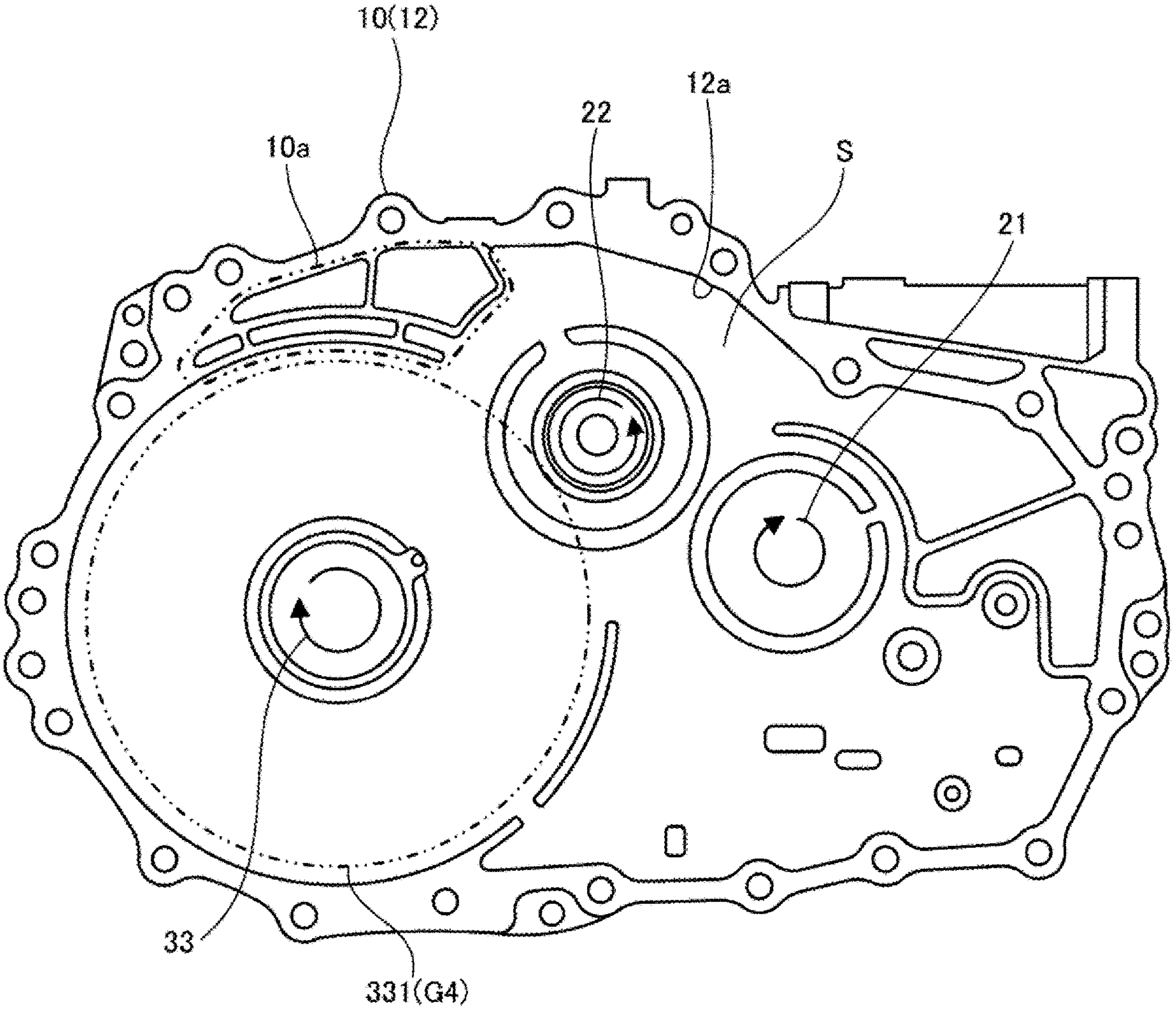
FIG. 3 is a view of a housing when viewed from a case body side in the axial direction.

FIG. 2 is a view of the case body 11 when viewed from a housing 12 side in the axial direction. FIG. 3 is a view of the housing 12 when viewed from a case body 11 side in the axial direction. In FIGS. 2 and 3, the first shaft 21, the second shaft 22, and the third shaft 33 are schematically shown together by arrows indicating rotation directions. In FIGS. 2 and 3, the third gear portion 331 (therefore, the fourth gear G4) is indicated together by a two-dot chain line. In FIGS. 2 and 3, an up-down direction corresponds to the direction of gravity, and the left-right direction corresponds to a front-rear direction of the vehicle.

The case 10 has an air breather structure 10*a*. The air breather structure 10*a* is provided in the case 10, separates the air and the oil in the accommodating chamber S, and communicates with the atmosphere. The inside of the case 10 is formed as a space surrounded by an outer wall portion (a wall portion constituting an outer wall of the case 10) of the case 10, and the accommodating chamber S is separated as a space in which the deceleration mechanism 20 and the differential gear 30 are disposed in the case 10.

The air breather structure 10*a* is provided above and in the vicinity of the third shaft 33. The terms "above" and "below"

refer to disposing that appears to overlap in the direction of gravity when viewed in a predetermined direction including the axial direction and the radial direction. For example, when a first element overlaps a second element in the direction of gravity when viewed in the axial direction, if a position of the first element is higher than that of the second element, the first element is above the second element. In this case, the first element and the second element may overlap each other or be offset when viewed in the radial direction.

The air breather structure 10*a* is provided above the third shaft 33 by having a portion overlapping with the third shaft 33 in the direction of gravity at a position higher than the third shaft 33, that is, an overlapped portion in the direction of gravity. The air breather structure 10*a* is provided within a range that does not protrude from the fourth gear G4 in the left-right direction of FIGS. 2 and 3. The air breather structure 10*a* is provided at a position higher than the fourth gear G4 of the third shaft 33 at each position in the left-right direction of FIGS. 2 and 3, so that the air breather structure 10*a* is provided at the position higher than the fourth gear G4 as a whole.

Figure 4:
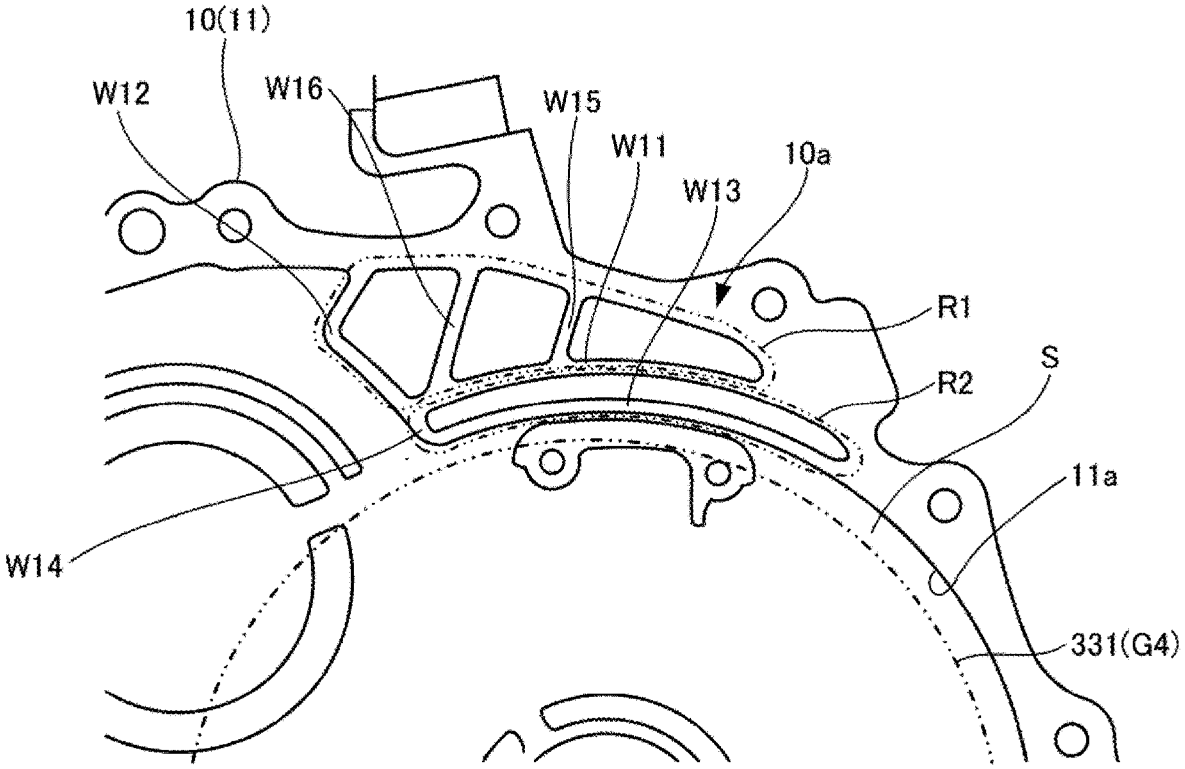
FIG. 4 is an expanded view of a portion of an air breather structure provided in the case body.
Figure 5:
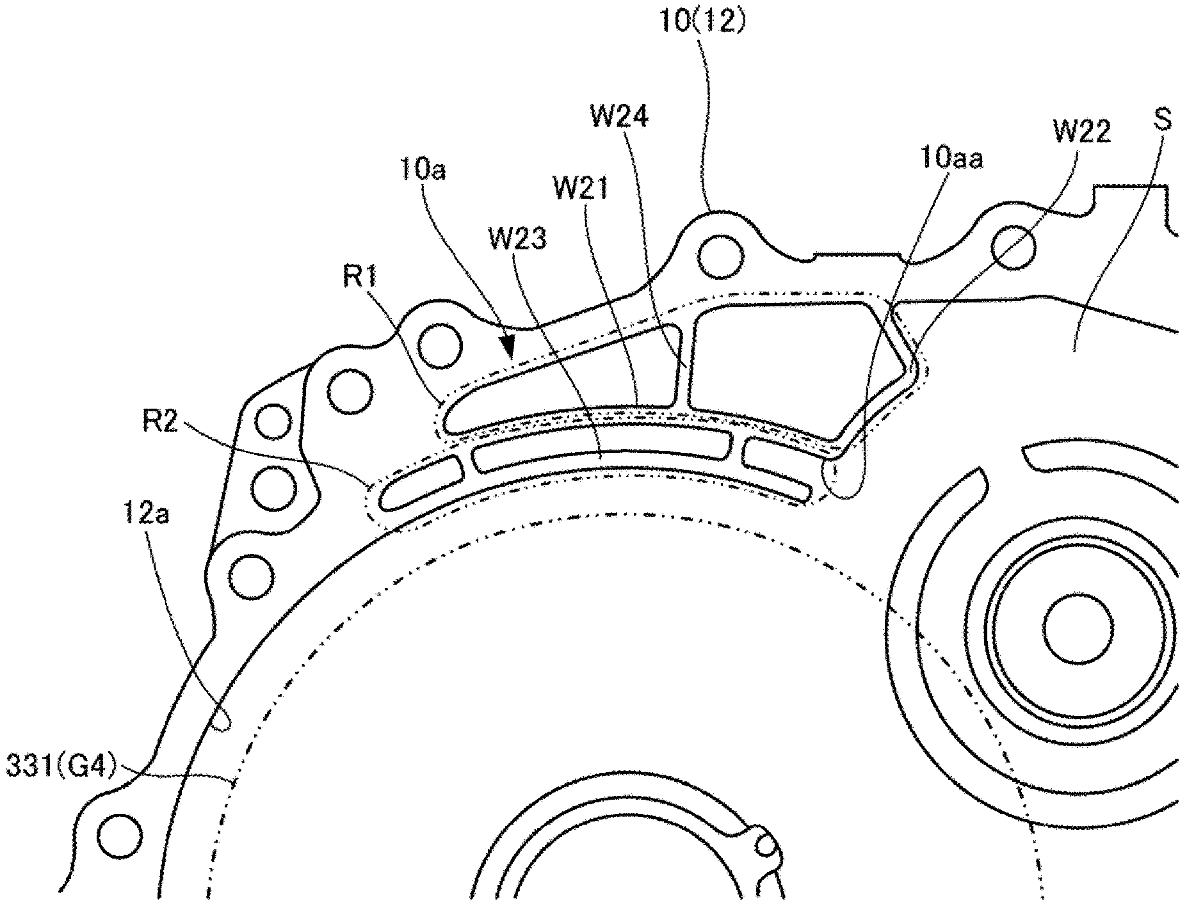
FIG. 5 is an expanded view of a portion of the air breather structure provided in the housing.

FIG. 4 is an expanded view of a portion of the air breather structure 10*a* provided in the case body 11 side. FIG. 5 is an expanded view of a portion of the air breather structure 10*a* provided in the housing 12 side. In FIGS. 4 and 5, the third gear portion 331 (therefore, the fourth gear G4) is indicated together by the two-dot chain line. In FIGS. 4 and 5, the up-down direction corresponds to the direction of gravity, and the left-right direction corresponds to the front-rear direction of the vehicle.

As shown in FIGS. 4 and 5, the air breather structure 10*a* includes an air breather chamber R1 and a defense chamber R2. In the air breather structure 10*a*, the air breather chamber R1 is divided on the upper side in the direction of gravity, and the defense chamber R2 is divided on the lower side in the direction of gravity. The defense chamber R2 provided in this way is adjacent to the air breather chamber R1 between the air breather chamber R1 and the accommodating chamber S. The defense chamber R2 is provided between the air breather chamber R1 and the fourth gear G4 provided in the accommodating chamber S, and thus the defense chamber R2 is provided on an inner side in the case 10 with respect to the air breather chamber R1. The defense chamber R2 is adjacent to the accommodating chamber S on a side (lower side in FIGS. 4 and 5) opposite to a side adjacent to the air breather chamber R1.

The air breather structure 10*a* includes an inner wall portion W11, an inner wall portion W21, an inner wall portion W12, and an inner wall portion W22. The air breather chamber R1 and the defense chamber R2 are vertically separated in the direction of gravity by the inner wall portion W11 and the inner wall portion W21, and are adjacent to each other across the inner wall portion W11 and the inner wall portion W21.

Each of the inner wall portion W11 and the inner wall portion W21 is connected to the outer wall portion of the case 10 at one end (the right side in FIG. 4 and the left side in FIG. 5) in the left-right direction in FIGS. 4 and 5. The inner wall portion W12 is connected to the other end (the left side in FIG. 4) of the inner wall portion W11 in the left-right direction in FIG. 4, and the inner wall portion W22 is connected to the other end (the right side in FIG. 5) of the inner wall portion W21 in the left-right direction in FIG. 5. The inner wall portion W12 extends upward from a connection portion with the inner wall portion W11 and is connected to the outer wall portion of the case 10, and the inner wall portion W22 extends upward from a connection portion with the inner wall portion W21 and is connected to the outer wall portion of the case 10.

The air breather chamber R1 is formed as a cavity surrounded by mating the inner wall portion W11 and the inner wall portion W21 and mating the inner wall portion W12 and the inner wall portion W22, that is, by abutting the above. The inner wall portion W11 and the inner wall portion W21 constitute a partition wall that separates the air breather chamber R1 and the defense chamber R2 in a state in which the case body 11 and the housing 12 are mated with each other. The inner wall portion W12 and the inner wall portion W22 constitute a partition wall that separates the air breather chamber R1 and the accommodating chamber S in the state in which the case body 11 and the housing 12 are mated with each other.

The air breather chamber R1 is formed as a cavity surrounded by the outer wall portion of the case 10 other than the inner wall portion W11, the inner wall portion W12, the inner wall portion W21, and the inner wall portion W22. A wall portion of the air breather chamber R1 located in the left-right direction of the vehicle (the axial direction of the fourth gear G4) is constituted by the outer wall portion of the case 10. The outer wall portion of the case 10 constituting the air breather chamber R1 constitutes a partition wall that separates the air breather chamber R1 from the atmosphere.

The inner wall portion W11 and the inner wall portion W21, and the inner wall portion W12 and the inner wall portion W22 constitute air breather forming portions that form the air breather chamber R1. Therefore, in other words, the air breather chamber R1 is formed as a cavity surrounded by the air breather forming portions. The fact that the air breather structure 10*a* has the air breather chamber R1 is synonymous with the fact that the air breather structure 10*a* has the air breather forming portions, and the same applies to the defense chamber R2 and the accommodating chamber S. The air breather forming portion, defense chamber forming portions that form the defense chamber R2, and accommodating chamber forming portions that form the accommodating chamber S, can be implemented by the wall portion of the case 10.

The air breather structure 10*a* further includes an inner wall portion W13, an inner wall portion W23, and an inner wall portion W14. The inner wall portion W13 and the inner wall portion W23 constitute a lower wall portion of the air breather structure 10*a*, and also constitute a lower wall portion of the defense chamber R2. The lower wall portion of the defense chamber R2 constitutes a facing wall portion that faces a tooth flank of the fourth gear G4 scrapping up the oil. The tooth flank of the fourth gear G4 is set to an outer peripheral surface of the fourth gear G4 (surface formed on an outer periphery of the fourth gear G4 by respective gear teeth of the fourth gear G4).

Each of the inner wall portion W13, the inner wall portion W23, the inner wall portion W11, and the inner wall portion W21 has a shape curved along the third shaft 33. The curved shape is a shape along the fourth gear G4 as a maximum outer diameter portion of the third shaft 33. The air breather structure 10*a* is provided to have, for example, such a curved shape with respect to the third shaft 33, and is accordingly provided as close to the third shaft 33 as possible, and thus the air breather structure 10*a* is provided in the vicinity of the third shaft 33.

Each of the inner wall portion W13 and the inner wall portion W23 is connected to the outer wall portion of the case 10 at one end (the right side in FIG. 4 and the left side in FIG. 5) in the left-right direction in FIGS. 4 and 5. The inner wall portion W14 is connected to the other end (the left side in FIG. 4) of the inner wall portion W13 in the left-right direction in FIG. 4. The inner wall portion W14 extends upward from a connection portion with the inner wall portion W13 and is connected to the inner wall portion W11. The inner wall portion W14 is connected to the inner wall portion W11 and the inner wall portion W12 by being connected to the connection portion between the inner wall portion W11 and the inner wall portion W12.

The inner wall portion W23 is not connected to the inner wall portion W21 on the other side (the right side in FIG. 5), and forms a discharge hole 10*aa* of the defense chamber R2 between the inner wall portion W23 and the inner wall portion W21. The discharge hole 10*aa* is provided in the housing 12 and is formed by not connecting the other ends of the inner wall portion W21 and the inner wall portion W23. The discharge hole 10*aa* formed in this way is provided in the defense chamber R2, and allows the defense chamber R2 to communicate with the accommodating chamber S. The discharge hole 10*aa* may be formed by, for example, connecting the other ends of the inner wall portion W21 and the inner wall portion W23 at the inner wall portion and being provided at the inner wall portion.

The discharge hole 10*aa* opens to the accommodating chamber S at a position in which the discharge hole 10*aa* does not face the tooth flank of the fourth gear G4. Therefore, the discharge hole 10*aa* is not provided at the inner wall portion W23 facing the tooth flank of the fourth gear G4. The discharge hole 10*aa* may be provided in the case body 11 (for example, the inner wall portion W14). The fourth gear G4 corresponds to a gear.

The defense chamber R2 is formed as a cavity surrounded by mating the inner wall portion W13 and the inner wall portion W23. The inner wall portion W13 and the inner wall portion W23 constitute a partition wall that separates the defense chamber R2 and the accommodating chamber S in the state in which the case body 11 and the housing 12 are mated with each other.

The defense chamber R2 is formed as a cavity surrounded by the inner wall portion W11 and the inner wall portion W21, and the inner wall portion W14 and the outer wall portion of the case 10 other than the inner wall portion W13 and the inner wall portion W23. The inner wall portion W14 constitutes a partition wall that separates the defense chamber R2 and the accommodating chamber S in the case body 11 side in the state in which the case body 11 and the housing 12 are mated with each other. A wall portion of the defense chamber R2 located in the left-right direction of the vehicle (the axial direction of the fourth gear G4) is formed by the outer wall portion of the case 10. The outer wall portion of the case 10 constituting the defense chamber R2 constitutes a partition wall that separates the defense chamber R2 from the atmosphere.

The inner wall portion W13 and the inner wall portion W23, the inner wall portion W11 and the inner wall portion W21, and the inner wall portion W14 and the outer wall portion of the case 10 constitute the defense chamber forming portions that form the defense chamber R2 together. Therefore, the defense chamber R2 is formed as a cavity surrounded by the defense chamber forming portions. Since the discharge hole 10*aa* is provided, the defense chamber R2 communicates with the accommodating chamber S via the discharge hole 10*aa* while being surrounded by the defense chamber forming portions.

The air breather structure 10*a* further includes an inner wall portion W15, an inner wall portion W16, and an inner wall portion W24. The inner wall portion W15, the inner wall portion W16, and the inner wall portion W24 are provided in the air breather chamber R1. The air breather chamber R1 is configured as a labyrinth chamber, and separates the air and the oil by circulating the air through a labyrinth passage. The labyrinth passage is formed by the inner wall portion W15, the inner wall portion W16, and the inner wall portion W24 which are a plurality of walls alternately provided in the left-right direction in FIGS. 4 and 5 on the case body 11 side and the housing 12 side of the air breather chamber R1. The inner wall portion W15, the inner wall portion W24, and the inner wall portion W16 are disposed side by side in this order in the left-right direction in FIGS. 4 and 5. A portion from the inner wall portion W11 to the inner wall portion W16 corresponds to a first inner wall portion, and a portion from the inner wall portion W21 to the inner wall portion W24 corresponds to a second inner wall portion.

Next, the air breather structure 10*a* will be further described with reference to FIG. 6.

Figure 6:
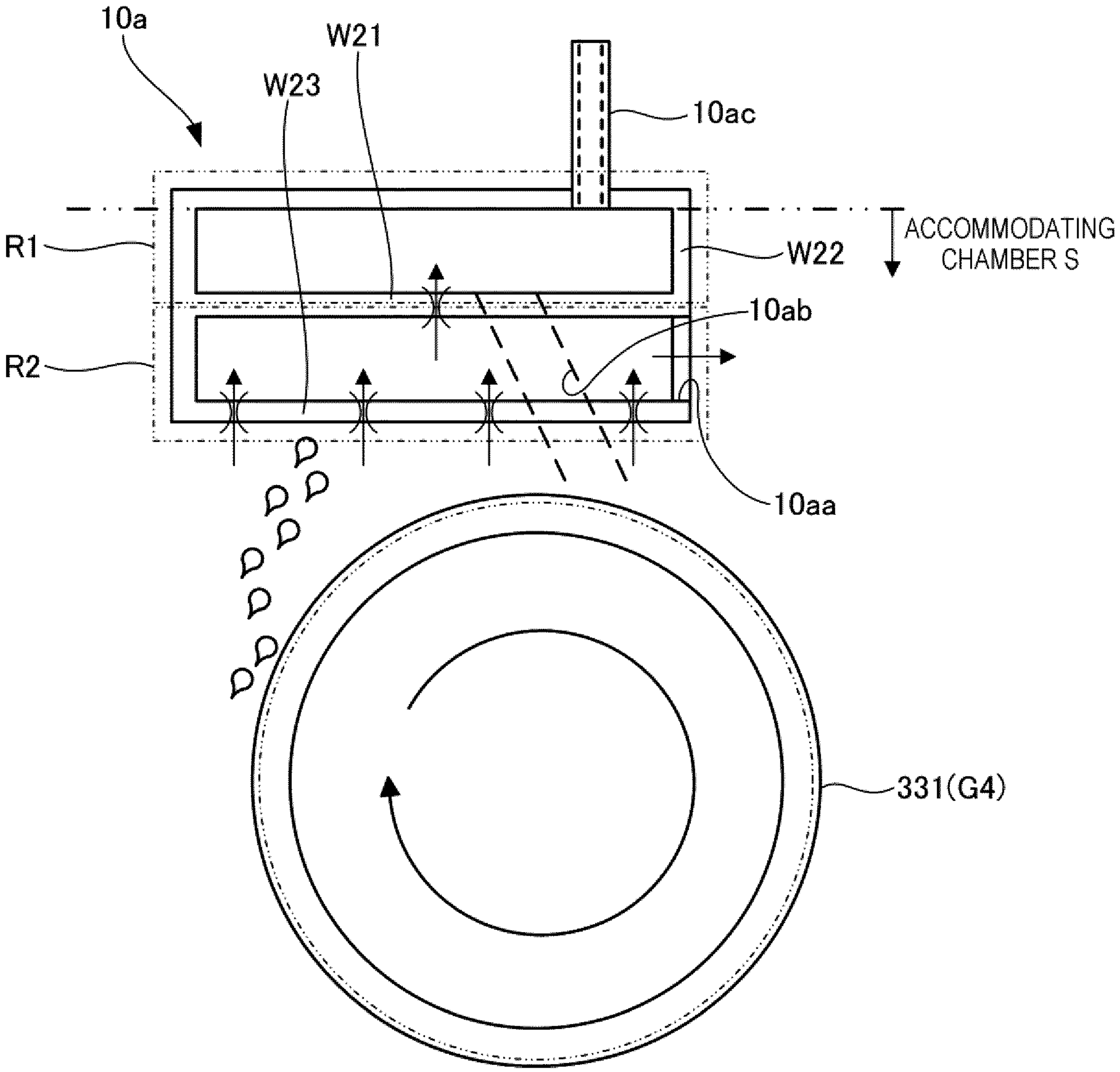
FIG. 6 is an explanatory view of the air breather structure.

FIG. 6 is an explanatory view of the air breather structure 10*a*. In FIG. 6, the air breather structure 10*a* is schematically shown together with the fourth gear G4 as the third gear portion 331. FIG. 6 is a view of the air breather structure 10*a* when viewed in the axial direction from the case body 11 side, and corresponds to FIG. 3 or FIG. 5 viewed in the axial direction. In FIG. 6, the up-down direction corresponds to the direction of gravity, and the left-right direction corresponds to the front-rear direction of the vehicle.

The air breather structure 10*a* further includes a communication hole 10*ab* and a breather pipe 10*ac*. The communication hole 10*ab* allows the air breather chamber R1 to communicate with the accommodating chamber S, and the breather pipe 10*ac* allows the air breather chamber R1 to communicate with the atmosphere. Therefore, the air breather chamber R1 is provided with the communication hole 10*ab* as a communication portion communicating with the accommodating chamber S, and the breather pipe 10*ac* as a communication portion communicating with the atmosphere. The communication hole 10*ab* corresponds to a first communication portion, and the breather pipe 10*ac* corresponds to a second communication portion.

Both the communication hole 10*ab* and the breather pipe 10*ac* are provided in the housing 12. The communication hole 10*ab* may be provided in the case body 11, and the same applies to the breather pipe 10*ac*. The breather pipe 10*ac* penetrates the outer wall portion of the case 10 from above the air breather chamber R1 and allows the air breather chamber R1 to communicate with the atmosphere.

The communication hole 10*ab* is provided to bypass the defense chamber R2. Therefore, the communication hole 10*ab* does not open to the defense chamber R2. The communication hole 10*ab* extends in the wall portion of the case 10 from the air breather chamber R1 and opens to the accommodating chamber S between the inner wall portion W23 and the fourth gear G4. Regarding the communication hole 10*ab*, an extension shape and an opening position can be set such that the oil scrapped up by the fourth gear G4 is less likely to enter the air breather chamber R1 via the communication hole 10*ab*.

For example, the communication hole 10*ab* extends linearly, and the opening to the accommodating chamber S is provided on the right side in FIG. 6 with respect to the opening to the air breather chamber R1, that is, on the rear side in the rotation direction of an upper half portion of the fourth gear G4. The opening of the communication hole 10*ab* to the accommodating chamber S is provided behind an upper end of the fourth gear G4 in the rotation direction of the upper half portion of the fourth gear G4. The communication hole 10*ab* may be bent.

In a state in which the inner wall portion W21 is mated with the inner wall portion W11 on the case body 11 side, the inner wall portion W21 and the inner wall portion W11 come into metal touch with each other, that is, come into metal contact with each other, and no seal member is particularly provided between the inner wall portion W21 and the inner wall portion W11. That is, mating surfaces of the inner wall portion W21 and the inner wall portion W11 are not completely sealed, and a gap is formed between the mating surfaces due to a dimension error, an assembly error, deformation, or the like.

Therefore, the air breather structure 10*a* has a structure in which the air flows from the defense chamber R2 to the air breather chamber R1 through the gap formed between the mating surfaces of the inner wall portion W21 and the inner wall portion W11, and the air breather chamber R1 and the defense chamber R2 do not communicate with each other through a hole or the like communicating the air breather chamber R1 with the defense chamber R2.

The same gap is also formed between mating surfaces of the inner wall portion W23 and the inner wall portion W13. Therefore, the oil scrapped up by the fourth gear G4 from the accommodating chamber S enters the defense chamber R2 through the gap formed between the mating surfaces. Arrows shown on the inner wall portion W23 together with squeezed drops schematically indicate the oil entering the defense chamber R2 in this manner. In FIG. 6, for convenience of description, the air breather structure 10*a* is shown to be larger than those in FIGS. 3 and 5, but the same applies to the case in which the air breather structure 10*a* is provided as shown in FIGS. 3 and 5.

The oil entering the defense chamber R2 is discharged mainly from the defense chamber R2 to the accommodating chamber S through the discharge hole 10*aa*. That is, since the discharge hole 10*aa* is provided in the defense chamber R2, even when the oil is accumulated in the defense chamber R2, the accumulated oil is discharged mainly from the defense chamber R2 to the accommodating chamber S through the discharge hole 10*aa*. The discharge hole 10*aa* also serves to restrain an increase in an internal pressure of the defense chamber R2. In view of these facts, in the air breather structure 10*a*, the amount of the oil entering the air breather chamber R1 from the defense chamber R2 through the gap between the inner wall portion W21 and the inner wall portion W11 is reduced. As a result, the discharge of the oil to the atmosphere from the air breather chamber R1 through the breather pipe 10*ac* is restrained.

The discharge hole 10*aa* opens to the accommodating chamber S at the position in which the discharge hole 10*aa* does not face the tooth flank of the fourth gear G4 of the differential gear 30. Therefore, the oil scrapped up by the fourth gear G4 is less likely to enter the defense chamber R2 through the discharge hole 10*aa*. As a result, the oil entering the defense chamber R2 is restrained, and thus the discharge of the oil to the atmosphere due to the oil entering from the discharge hole 10*aa* is also restrained from being facilitated.

In the air breather chamber R1, the air is separated from the oil by flowing through the labyrinth passage. The air is discharged from the air breather chamber R1 to the atmosphere through the breather pipe 10*ac*, and the oil is discharged to the accommodating chamber S through the communication hole 10*ab*. Therefore, the discharge of the oil to the atmosphere is also restrained by the communication hole 10*ab*.

The communication hole 10*ab* is provided such that the oil scrapped up by the fourth gear G4 is less likely to enter the air breather chamber R1 via the communication hole 10*ab*. Therefore, the discharge of the oil to the atmosphere due to the oil entering from the communication hole 10*ab* is also restrained from being facilitated.

Next, main functions and effects of the present embodiment will be described.

(1) The air breather structure 10*a* is provided in the case 10 including the case body 11 and the housing 12 that form the accommodating chamber S in the state of being mated to each other. The air breather structure 10*a* includes the air breather chamber R1 that is formed as the cavity surrounded by mating the inner wall portion W11 and the inner wall portion W12 and mating the inner wall portion W21 and the inner wall portion W22, and that is provided with the communication hole 10*ab* communicating with the accommodating chamber S and the breather pipe 10*ac* communicating with the atmosphere; and the defense chamber R2 that is adjacent to the air breather chamber R1 between the accommodating chamber S and the air breather chamber R1, and that is formed as the cavity surrounded by mating the inner wall portion W13 and the inner wall portion W23.

With such a configuration, since the defense chamber R2 adjacent to the air breather chamber R1 between the accommodating chamber S and the air breather chamber R1 is provided, the defense chamber R2 serves to restrain the entry of the oil into the air breather chamber R1, and the entry of the oil into the air breather chamber R1 becomes difficult. Further, even when the oil enters into the air breather chamber R1, the entered oil can be discharged to the accommodating chamber S via the communication hole 10*ab*. Therefore, it is possible to restrain the discharge of the oil from the air breather chamber R1 to the atmosphere.

(2) In the air breather structure 10*a*, the defense chamber R2 is provided with the discharge hole 10*aa* for discharging the oil entering into the defense chamber R2 to the accommodating chamber S. With such a configuration, the oil accumulated in the defense chamber R2 can be discharged, and the increase in the internal pressure of the defense chamber R2 can also be restrained. Therefore, the amount of the oil entering the air breather chamber R1 from the defense chamber R2 through the gap between the inner wall portion W21 and the inner wall portion W11 can be reduced, and thus it is possible to restrain the discharge of the oil from the air breather chamber R1 to the atmosphere.

(3) In the air breather structure 10*a*, the differential gear 30 as the gear mechanism is accommodated in the accommodating chamber S. The discharge hole 10*aa* opens to the accommodating chamber S at the position in which the discharge hole 10*aa* does not face the tooth flank of the fourth gear G4 of the differential gear 30. With such a configuration, the oil scrapped up by the fourth gear G4 can be restrained from entering the defense chamber R2 through the discharge hole 10*aa*. As a result, the oil entering the defense chamber R2 is restrained. Therefore, it is possible to restrain the discharge of the oil from the air breather chamber R1 to the atmosphere by restraining the discharge of the oil to the atmosphere due to the oil entering from the discharge hole 10*aa* from being facilitated.

The air breather structure 10*a* may be configured as follows.

Figure 7:
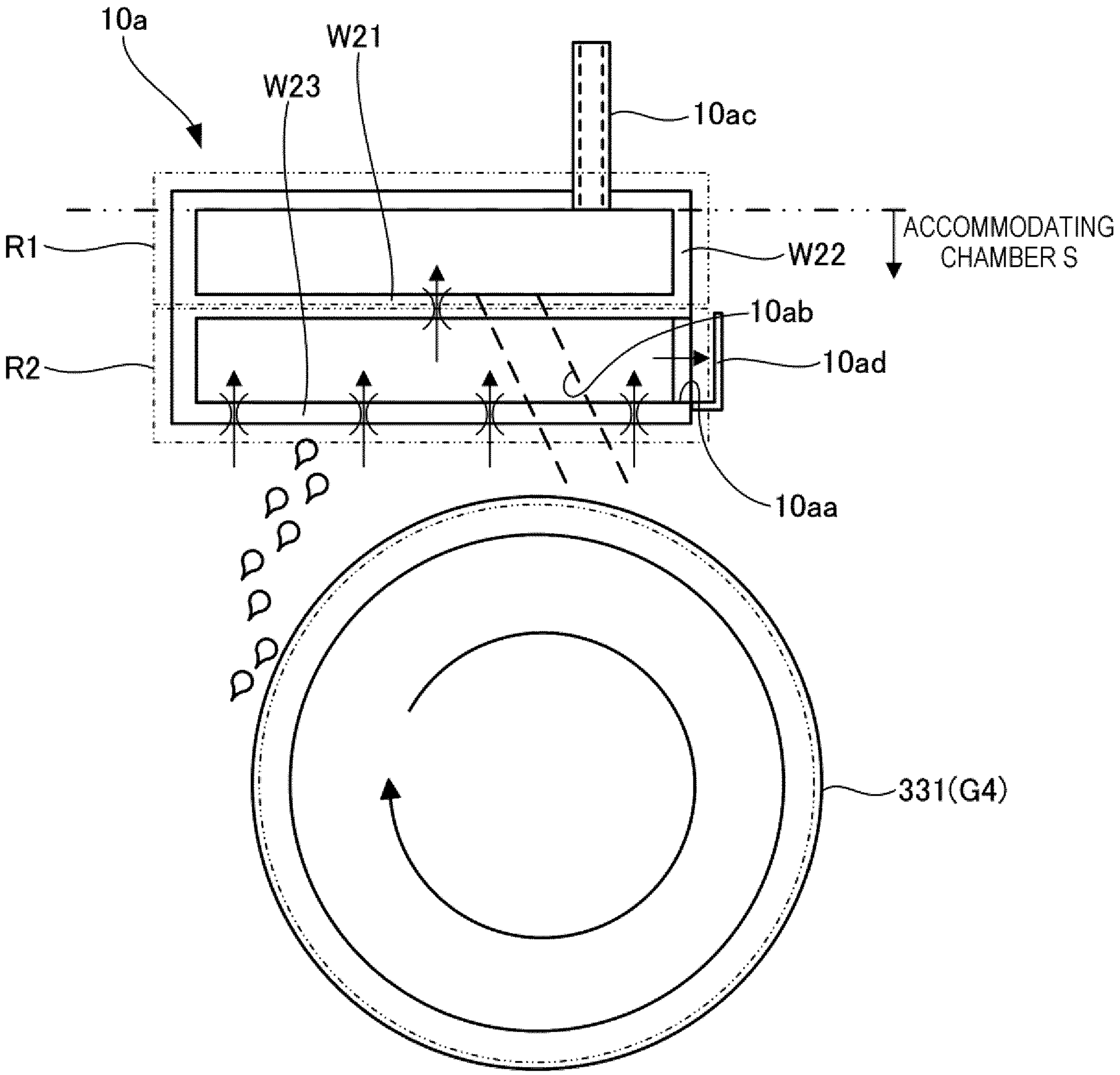
FIG. 7 is a diagram showing a first modification of the air breather structure.
Figure 8:
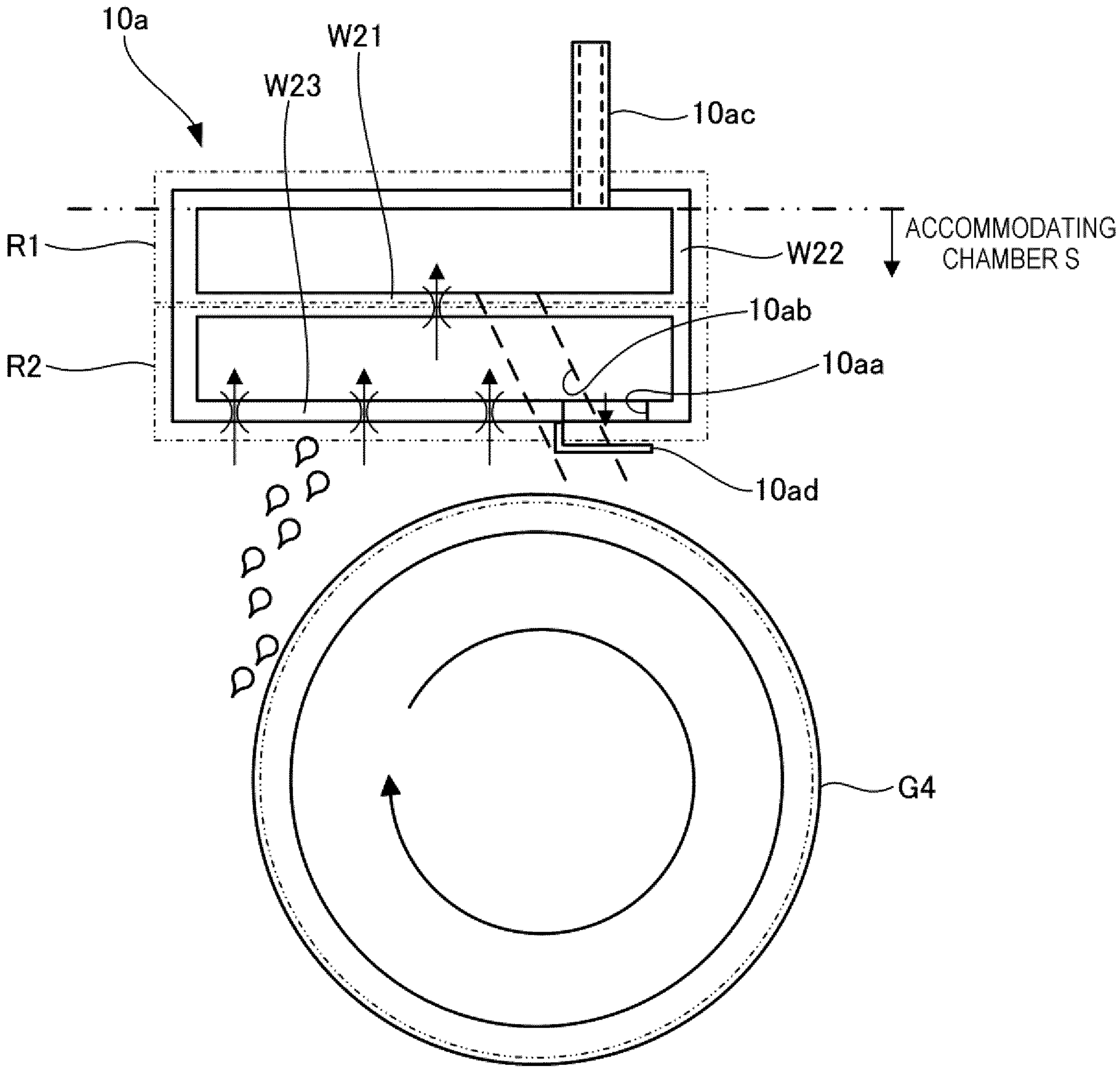
FIG. 8 is a diagram showing a second modification of the air breather structure.

FIG. 7 is a diagram showing a first modification of the air breather structure 10*a*. FIG. 8 is a diagram showing a second modification of the air breather structure 10*a*. In the example shown in FIG. 7, the air breather structure 10*a* further includes a baffle plate 10*ad*. The baffle plate 10*ad* is provided with respect to an outlet of the discharge hole 10*aa*. The baffle plate 10*ad* is formed of, for example, a rectangular plate member, and is provided on the inner wall portion W23. The baffle plate 10*ad* is provided at the other end (the right side in FIG. 7) of the inner wall portion W23 in the left-right direction in FIG. 7, extends from the other end in an opening direction (the left-right direction in FIG. 7) of the outlet of the discharge hole 10*aa*, and then is bent and extends on a discharge hole 10*aa* side (the upper side in FIG. 7). A portion of the baffle plate 10*ad* that is bent and extends on the discharge hole 10*aa* side covers the entire discharge hole 10*aa* when viewed in the opening direction of the outlet of the discharge hole 10*aa*. The baffle plate 10*ad* can be provided to cover at least a part of the discharge hole 10*aa*.

In the example shown in FIG. 8, the discharge hole 10*aa* is provided to open to the accommodating chamber S at a position in which the discharge hole 10*aa* faces the tooth flank of the fourth gear G4. The baffle plate 10*ad* is provided with respect to the outlet of the discharge hole 10*aa* provided as described above. Therefore, in this example, the baffle plate 10*ad* extends in the opening direction (the up-down direction in FIG. 8) of the outlet of the discharge hole 10*aa* from a lower surface of a portion of the inner wall portion W23 on the left side in FIG. 8 (the front side in the rotation direction of the upper half portion of the fourth gear G4) with respect to the discharge hole 10*aa*, and then is bent and extends on the discharge hole 10*aa* side (the right side in FIG. 8). The portion of the baffle plate 10*ad* that is bent and extends on the discharge hole 10*aa* side covers the entire discharge hole 10*aa* when viewed in the opening direction of the outlet of the discharge hole 10*aa*. In this example, the baffle plate 10*ad* is preferably provided to cover the entire discharge hole 10*aa*.

(4) In either case, the oil in the accommodating chamber S is blocked by the baffle plate 10*ad* provided with respect to the outlet of the discharge hole 10*aa*, and the oil is prevented from reaching the discharge hole 10*aa*. Therefore, in these examples, the baffle plate 10*ad* can further restrain the oil in the accommodating chamber S from entering the defense chamber R2 through the discharge hole 10*aa*. As a result, in the case of the first modification, it is possible to further restrain the discharge of the oil to the atmosphere due to the oil entering from the discharge hole 10*aa* from being facilitated. Further, in the case of the second modification, even when the discharge hole 10*aa*, which opens to the accommodating chamber S at the position in which the discharge hole 10*aa* faces the tooth flank of the fourth gear G4, is provided, it is possible to restrain the discharge of the oil to the atmosphere due to the oil entering from the discharge hole 10*aa* from being facilitated.

Although the embodiments of the present invention have been described above, the above embodiments are merely a part of application examples of the present invention, and are not intended to limit the technical scope of the present invention to the specific configurations of the above embodiments.

The present application claims a priority based on Japanese Patent Application No. 2022-126640 filed with the Japan Patent Office on Aug. 8, 2022, all the contents of which are hereby incorporated by reference.

DESCRIPTION OF REFERENCE SIGNS

10 case
11 case body (first case member)
12 housing (second case member)
10*a* air breather structure
10*aa* discharge hole
10*ab* communication hole (first communication portion)
10*ac* breather pipe (second communication portion)
10*ad* baffle plate
30 differential gear (gear mechanism)
100 power transmission device
G4 fourth gear (gear)
R1 air breather chamber
R2 defense chamber
S accommodating chamber
W11, W12, W13, W14, W15, W16 inner wall portion (first inner wall portion)
W21, W22, W23, W24 inner wall portion (second inner wall portion)

The invention claimed is:

1. An air breather structure to be provided in a case including a first case member and a second case member that form an accommodating chamber in a state of being mated to each other, the air breather structure comprising:
an air breather chamber that is formed as a cavity surrounded by mating a first inner wall portion as an inner wall portion of the first case member and a second inner wall portion as an inner wall portion of the second case member, and that is provided with a first communication portion communicating with the accommodating chamber and a second communication portion communicating with the atmosphere; and
a defense chamber that is adjacent to the air breather chamber between the accommodating chamber and the air breather chamber, and that is formed as a cavity surrounded by mating the first inner wall portion and the second inner wall portion, wherein
the accommodating chamber accommodates a gear mechanism,
the first communication portion discharges an oil from the air breather chamber to the accommodating chamber, and
the first communication portion bypasses the defense chamber and does not communicate with the defense chamber.

2. The air breather structure according to claim 1, wherein
the defense chamber is provided with a discharge hole for discharging oil entering into the defense chamber to the accommodating chamber.

3. The air breather structure according to claim 2, wherein
the discharge hole opens to the accommodating chamber at a position in which the discharge hole does not face a tooth flank of a gear in the gear mechanism.

4. The air breather structure according to claim 2, wherein
a baffle plate for blocking the oil in the accommodating chamber is further provided with respect to an outlet of the discharge hole.

5. The air breather structure according to claim 3, wherein
a baffle plate for blocking the oil in the accommodating chamber is further provided with respect to an outlet of the discharge hole.

6. The air breather structure according to claim 1, wherein the gear mechanism includes a deceleration mechanism.

* * * * *